(12) United States Patent
Bosma et al.

(10) Patent No.: US 7,527,099 B2
(45) Date of Patent: May 5, 2009

(54) SYSTEM FOR SEALING A SPACE IN A WELLBORE

(75) Inventors: Martin Gerard Rene Bosma, Assen (NL); Erik Kerst Cornelissen, Rijswijk (NL); Juul Cuijpers, Eindhoven (NL); Francesco Picchioni, Groningen (NL); Sanjay Rastogi, Eindhoven (NL)

(73) Assignee: Shell Oil Company, Houston, TX (US)

( * ) Notice: Subject to any disclaimer, the term of this patent is extended or adjusted under 35 U.S.C. 154(b) by 349 days.

(21) Appl. No.: 10/566,151

(22) PCT Filed: Jul. 22, 2004

(86) PCT No.: PCT/EP2004/051572

§ 371 (c)(1),
(2), (4) Date: Aug. 25, 2006

(87) PCT Pub. No.: WO2005/012686

PCT Pub. Date: Feb. 10, 2005

(65) Prior Publication Data

US 2007/0056735 A1 Mar. 15, 2007

(30) Foreign Application Priority Data

Jul. 29, 2003 (EP) .................. 03254738

(51) Int. Cl.
*E21B 33/12* (2006.01)
*E21B 33/13* (2006.01)

(52) U.S. Cl. ............... 166/295; 166/179; 166/207; 166/285; 166/387; 277/934; 277/936; 277/944

(58) Field of Classification Search ........... 166/179, 166/207, 285, 295, 387; 277/934–936, 944–946
See application file for complete search history.

(56) References Cited

U.S. PATENT DOCUMENTS

| 3,306,870 | A | 2/1967 | Eilers et al. | |
| 3,385,367 | A | 5/1968 | Kolisman | 166/191 |
| 3,502,149 | A | 3/1970 | Pence, Jr. | 166/295 |
| 4,137,970 | A | 2/1979 | Laflin et al. | 166/292 |
| 4,590,227 | A | 5/1986 | Nakamura et al. | 523/130 |
| 4,935,386 | A | 6/1990 | Nakagawa et al. | 437/160 |
| 4,936,386 | A | 6/1990 | Colangelo | 166/292 |
| 5,195,583 | A | 3/1993 | Toon et al. | 166/187 |
| 5,290,844 | A | 3/1994 | Otsuka | 524/426 |
| 2004/0158804 | A1 | 8/2004 | Hayles | 716/6 |
| 2004/0194971 | A1 | 10/2004 | Thomson | 166/387 |
| 2004/0261990 | A1 | 12/2004 | Bosma et al. | 166/50 |
| 2005/0252651 | A1 | 11/2005 | Bosma et al. | 166/51 |
| 2008/0135250 | A1* | 6/2008 | Bosma et al. | 166/285 |

FOREIGN PATENT DOCUMENTS

| GB | 2338500 | 12/1999 |
| WO | 02/059452 | 8/2002 |
| WO | 03/008756 | 1/2003 |
| WO | 2006053896 | 5/2006 |
| WO | 2006063988 | 6/2006 |

OTHER PUBLICATIONS

Buchholz, F.L. and Graham, A.T., "Modern superabsorbent polymer technology", Wiley NY 1998, p. 57.
Dan D. Caudle, "Produced Water Its Properties. Composition and Potential Environmental Impact", Particle Separation Journal, vol. 7, No. 3, Sep. 1994, pp. 95-101.
International Search Report dated Dec. 10, 2004 (PCT/EP2004/051572).

* cited by examiner

*Primary Examiner*—George Suchfield

(57) ABSTRACT

A system is provided for sealing a space in a wellbore formed in an earth formation. The system has a swelleable body arranged in the wellbore in a manner so as to seal the space upon swelling of the swelleable body, the swelleable body being susceptible of being in contact with formation water flowing into the wellbore, the swelleable body including a matrix material provided with a compound soluble in the formation water. The matrix material substantially prevents or restricts migration of the compound out of the swelleable body and allows migration of the formation water into the swelleable body by osmosis so as to induce swelling of the swelleable body upon migration of the formation water into the swelleable body.

18 Claims, 5 Drawing Sheets

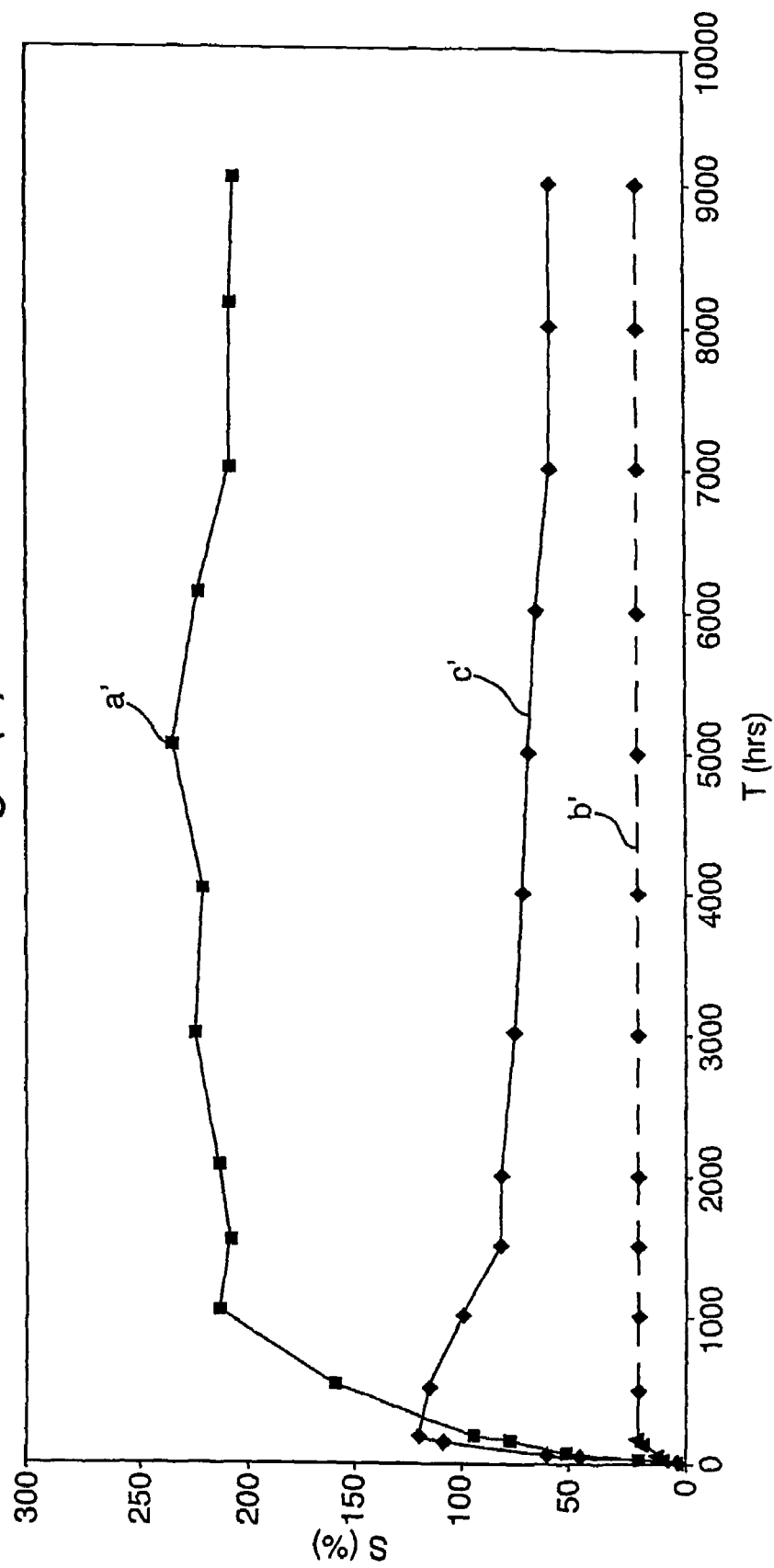

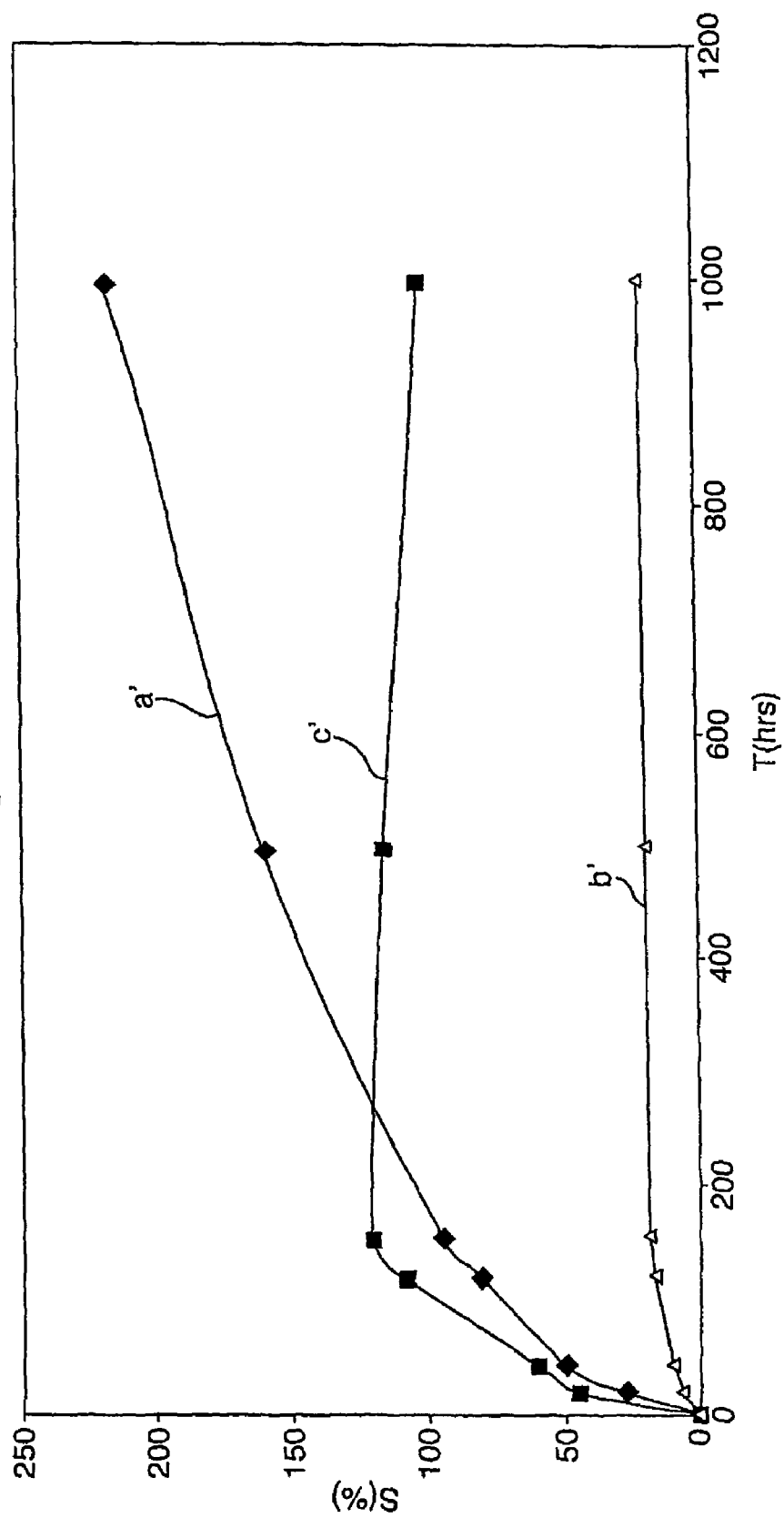

SYSTEM FOR SEALING A SPACE IN A WELLBORE

The present application claims priority on European Patent Application 03254738.2 filed Jul. 29, 2003.

FIELD OF THE INVENTION

The present inventions relates to a system and a method for sealing a space in a wellbore formed in an earth formation, the earth formation containing formation water susceptible of flowing into the wellbore.

BACKGROUND OF THE INVENTION

In the production of hydrocarbon fluid from a wellbore, it is common practice to install one or more tubular casing sections in the wellbore to stabilize the wellbore and to control inflow of fluid into the wellbore from the surrounding formation. In conventional applications the casing sections are of stepwise decreasing diameter in downward direction, which is a consequence of the installation procedure whereby each next casing section must pass through the previously installed section.

It has been proposed to provide alternative casing schemes which overcome the problem of stepwise decreasing casing diameters. For example in one such alternative casing scheme, each casing section is installed in the wellbore by lowering the casing section through the previously installed section to the desired depth whereby a short overlap section of the casing section extends into the previously installed section. Next the casing section is radially expanded in the wellbore to allow lowering of a drill string having a drill bit of relatively large diameter therethrough. After deepening the wellbore using the drill bit of relatively large diameter, a further casing section is lowered through the expanded casing section. Thereafter the cycle of expanding the casing section, further drilling the wellbore, and lowering a new casing section, is repeated. As a result a wellbore of substantially uniform diameter is achieved.

The installed casing sections may be fixed and sealed in the wellbore by pumping a layer of cement between the casing and the wellbore wall. Alternatively, the casing may be expanded against the wellbore wall. This technology could be applied to the Expandable Open Hole Liner, as well. The sealing function of the cement layer relates to the requirement that migration of formation fluids, such as formation water, through the annular space between the casing and the wellbore wall should be prevented. However it has been experienced that adequate sealing by pumping a layer of cement in the annular space, is sometimes difficult to achieve. For example if the drilling fluid used to drill the wellbore is not fully replaced by cement in the annular space, or if adequate filling of the annular space with cement is hampered by irregularities in the wellbore wall, there is a risk that formation fluids migrate in axial direction through the annular space.

WO 03/008756 discloses an alternative system for sealing an annular space in a wellbore, wherein a swellable annular seal is arranged in the annular space. The seal is made of a rubber material susceptible of swelling upon contact with oil or water, depending of the type of application. In use the seal swells when formation fluid enters the wellbore thereby sealing the annular space and preventing axial migration of formation fluid through the wellbore.

Examples of materials which swell when in contact with water are 1) Poly-Electrolytes such as Super Absorbing Polymers (SAP) such as Sodium Polyacrylate and Acrylic Acids, 2) hydrophilic clays such as Sodium Bentonite particles (e.g. Wyoming Bentonite), or 3) natural water swelling material such as wood, cork or cellulose fillers. Hydrophilic elastomers are used in civil engineering applications, for example as tunneling gaskets.

Although adequate swelling results have been obtained with the above materials when in contact with fresh (non-saline) water it has been experienced that seals made of these materials swell insufficiently when in contact with saline formation water. For example, Sodium Polyacrylate particles and Bentonite particles immersed in water have a sharply declining swelling ratio when the water changes from fresh water to saline water, especially if divalent cat ions such as $Ca^{2+}$ and $Mg^{2+}$ are present which is usually the case for common oilfield formation aquifers. The declining swelling ratio of SAP's in saline water, especially in bi-valent cation containing solutions, is reviewed in "Modern super absorbent polymer technology", Buchholz, F. L. and Graham, A. T., Wiley New York 1998, page 57 and FIG. 2.16, where the dramatic reduction in swelling capacity of a crosslinked sodium polyacrylate in 0.9 wt % NaCl solutions, is indicated for increasing $CaCl_2$ concentrations. Here, swelling ratio is defined as the ratio of the volume of a body after swelling thereof over the volume of the body before swelling thereof. Furthermore, hydrophilic Polyurethanes (such as Sanyo's Aquaprene C-520® Kuriyama's Aquaquell 8V®, Denbi's Hydrotite®) which do swell in saline solutions are considered unsuitable for most well applications in view of their limited long term resistance to higher temperatures.

SUMMARY OF THE INVENTION

The present inventions provide an improved system for sealing a space in a wellbore formed in an earth formation.

In accordance with one embodiment of the invention there is provided a system for sealing a space in a wellbore formed in an earth formation, comprising a swelleable body arranged in the wellbore in a manner so as to seal said space upon swelling of the swelleable body, the swelleable body being susceptible of being in contact with formation water flowing into the wellbore, the swelleable body comprising a matrix material provided with a compound soluble in said formation water, wherein the matrix material substantially prevents or restricts migration of the compound out of the swelleable body and allows migration of said formation water into the swelleable body by osmosis so as to induce swelling of the swelleable body upon migration of said formation water into the swelleable body.

Some of the embodiments of the invention also relates to a method of sealing a space in a wellbore formed in an earth formation, the method comprising arranging a swelleable body in the wellbore in a manner so as to seal said space upon swelling of the swelleable body, the swelleable body being susceptible to being in contact with formation water flowing into the wellbore, the swelleable body comprising a matrix material provided with a compound soluble in said formation water, wherein the matrix material substantially prevents or restricts migration of the compound out of the swelleable body and allows migration of said formation water into the swelleable body by osmosis so as to induce swelling of the swelleable body upon migration of said formation water into the swelleable body.

BRIEF DESCRIPTION OF THE DRAWINGS

The present invention is better understood by reading the following description of non-limitative embodiments with reference to the attached drawings, wherein like parts of each of the figures are identified by the same reference characters, and which are briefly described as follows:

FIG. 2a schematically shows the swelling behaviour of various rubber compositions when immersed in saline water, over a relatively long period of time;

FIG. 2b schematically shows the swelling behaviour of the rubber compositions of FIG. 2a over a relatively short period of time;

DETAILED DESCRIPTION OF THE INVENTION

Figure 1:
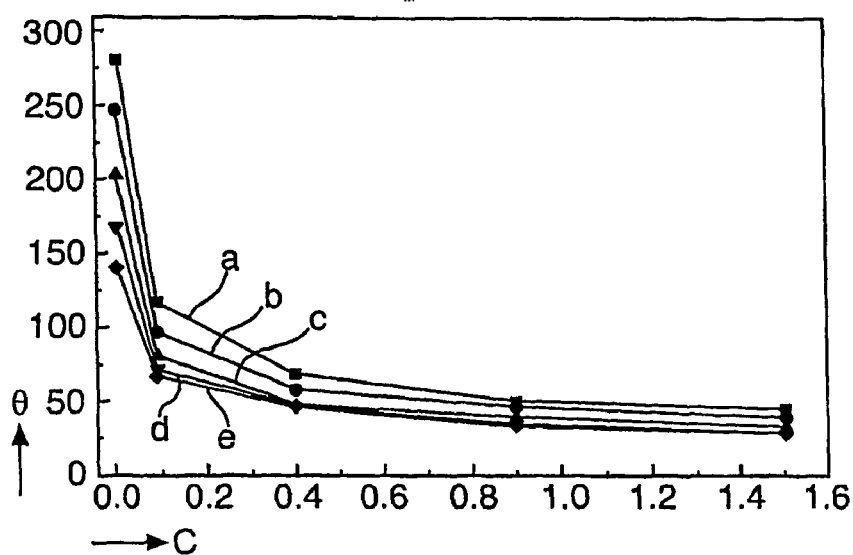
FIG. 1 schematically shows the swelling behaviour of a material not according to the invention when immersed in water, for various water salinities.

Referring to FIG. 1 there is shown a diagram giving the swelling ratio of Sodium Polyacrylate immersed in water as a function of NaCl salinity, and for different cross-linking densities (X), whereby Q=swelling ratio
C=NaCl concentration of the water (wt %)
line a: X=0.025 wt % Sodium Polyacrylate
line b: X=0.04 wt % Sodium Polyacrylate
line c: X=0.06 wt % Sodium Polyacrylate
line d: X=0.08 wt % Sodium Polyacrylate
line e: X=0.10 wt % Sodium Polyacrylate From the diagram it is clear that water swellable elastomers prepared by addition of Super Absorbent Polymer (SAP) particles to the rubber matrix material are unsuitable for saline wellbore conditions. Formation aquifers can be extremely saline (saturated at downhole temperatures), typically 4-6 times the salinity of common sea water. Especially the presence of di-valent cations such as $Ca^{2+}$ and $Mg^{2+}$ which are commonly present in oilfield aquifers, causes dramatic reduction of the swelling capability. Such SAP particles can be classified into starch systems, cellulose systems and synthetic resin systems. The SAP's have hydrophilic characteristics by virtue of the presence of alcohols, carboxylic acids, amides or sulphuric acids. Due to cross-linking, the particles have a three-dimensional network so that the material is capable of swelling to at least 100 times its original volume. Other potentially swelling polymers such as polyurethanes, polyesters, polyethers are considered unsuitable due to their intrinsic instability as a result of hydrolysis.

In FIGS. 2a, 2b is shown the swelling ratio (S) of three compositions marketed by RUMA®, Hoogeveen, The Netherlands, as a function of time. The compositions are available under the names:

900-70-1236, indicated by line a'
900-70-1354, indicated by line b'
900-70-1211, indicated by line c'

These compositions have as a base compound EPDM rubber matrix material available from Bayer®, Leverkusen, Germany under the trade name Buna EP® EPT-5459/6950.

Furthermore, these compositions include conventional reinforcing agents, fillers, vulcanising agents, and stabilisers.

Additionally:
composition 900 70-1236 includes NaCl particles available from AKZO, The Netherlands under the trade name MICROZO® moulded into the rubber matrix material to a concentration of 35 wt % of the rubber matrix material;
composition 900-70-1354 includes a SAP (and no salt);
composition 900-70-1211 includes salt and a SAP.

From the Figures it is clear that composition 900 70-1236 shows an excellent swelling ratio of more than 200 volume % in highly saline petroleum aquifer brines containing appreciable quantities of Bi-valent ions, $Ca^{2+}$, $Mg^{2+}$. Composition 900-70-1354 has a poor swelling performance (about 18 volume %), and the hybrid composition 900-70-1211 has a swelling performance inbetween the performance of compositions 900-70-1354 and 900-70-1236.

Figure 3:
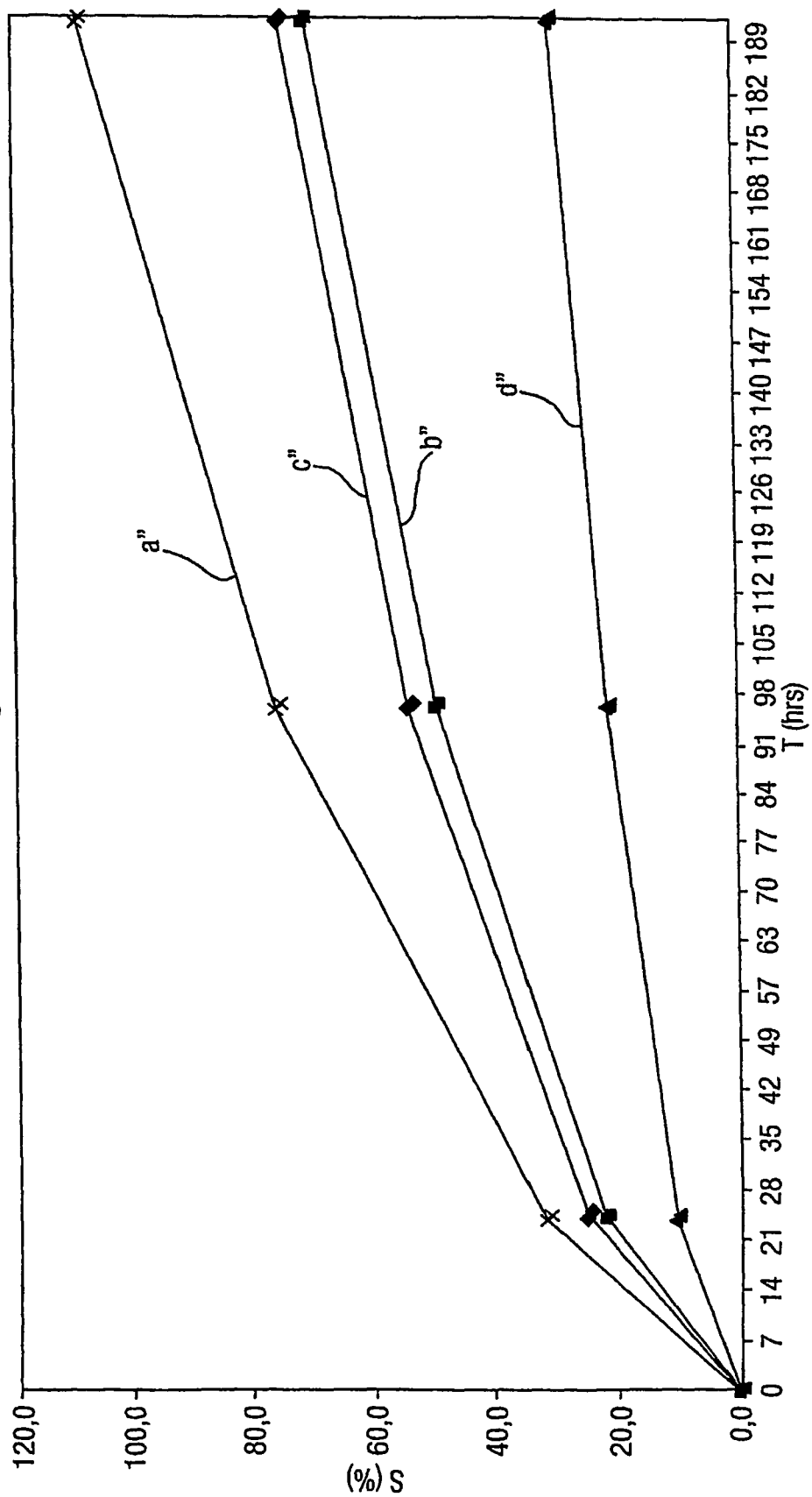
FIG. 3 schematically shows the swelling behaviour of a rubber composition when immersed in saline water, for various concentrations of salt contained in the rubber composition.

Referring to FIG. 3 there is shown a diagram indicating the swelling ratio (S) of compositions based on composition 900-70-1236, but now for different concentrations of NaCl particles in the rubber matrix material Buna EP® EPT-5459/6950. The salt particle concentrations are:

34.8 wt %, indicated by line a"
26.3 wt %, indicated by line b"
41.6 wt %, indicated by line c"
15.1 wt %, indicated by line d"

All other additives in these compositions were kept constant.

It appeared that the optimum swelling ratio was achieved for NaCl particle concentrations in the range of 32-37 wt % based on the weight of the matrix material.

Figure 5:
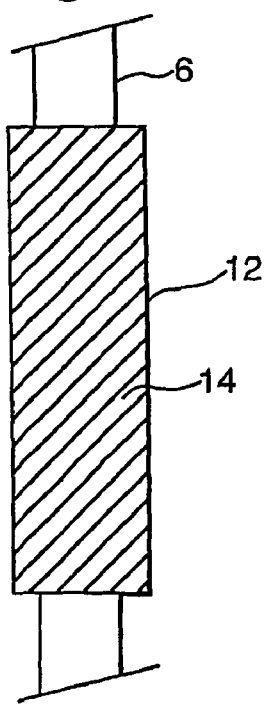
FIG. 5 schematically shows a side view of the casing and the annular seal of FIG. 4.
Figure 4:
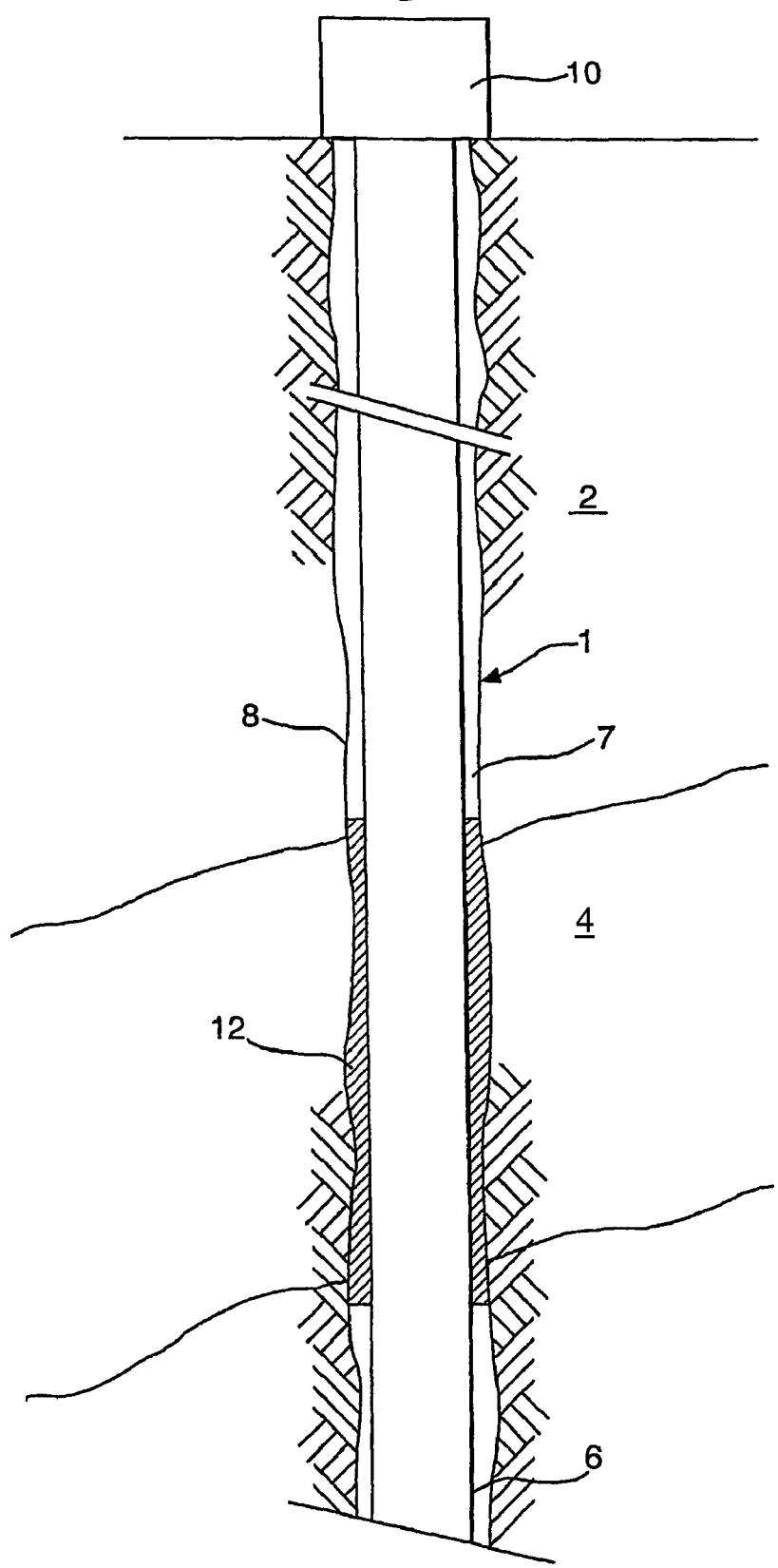
FIG. 4 schematically shows an embodiment of the system of the invention whereby an annular seal is arranged around a casing extending into a wellbore formed into an earth formation.

In FIGS. 4 and 5 is shown a wellbore 1 formed in an earth formation 2 which includes an earth formation layer 4 containing saline formation water. A wellbore casing 6 is arranged in the wellbore 1 whereby an annular space 7 is formed between the casing 6 and the wellbore wall 8. A wellhead 10 is arranged on top of the wellbore, at the earth surface. An annular seal in the form of a number of rings 12 (only one ring 12 is shown) is arranged in the annular space 7, in a portion of the wellbore opposite the earth formation layer 4.

The rings 12 are composed of one or more of the thermoset or thermoplastic elastomer materials susceptible of swelling in water, referred to above. The rings 12 are, for example, formed of strips 14 extending around the casing 6. Each ring 12 typically has a length of between 0.05-0.5 m, and a thickness of between 0.003-0.07 m. A bonding agent is applied between the rings and the casing to fix the rings 12 to the outer surface of the casing 6, the bonding agent preferably being effective during vulcanisation of the elastomer material. Furthermore, the rings 12 include a high concentration (at least 20 wt %, preferably between 30-35 wt % of the base elastomer) of salt particles so as to induce swelling of the elastomer material upon permeation of saline formation water into the elastomer material by osmosis. In the present example the salt particles are NaCl particles, but any high concentration of a mono-, di- or tri-valent water soluble salt can be used.

In order to protect the rings 12 during installation of the casing 6 in the wellbore, optionally the set of rings 12 is additionally provided with one or more rings ("wear pads") or sleeves which do not swell in water, such as NBR, HNBR, FKM, XNBR, FFKM, TFE/P rubber rings. Such additional rings should have a high abrasion resistance, and are preferably arranged at either side of each swelling elastomer ring 12. Alternatively these rings could be arranged at the ends of the set of rings 12 only.

During normal operation the NaCl particles are mixed into the rubber matrix material prior to vulcanisation thereof, using a suitable moulding apparatus (not shown) such as a) the two roll mill, b) the mixing mill, or c) the Gordon Plasticator. For a complete review of such techniques reference can be made to:

Werner Hofmann, Rubber Technology Handbook, $2^{nd}$ ed. (1996), Hanser/Gardner Publications, Cincinnati, ISBN 1-56990-145-7 Chapter 5: Processing of elastomers, 'Compound Preparation'.

The rubber matrix material is then formed into the strip 14, which is radially or slightly helically wrapped around the casing 6 at surface. In a next step the rubber matrix material, and optionally also the material of the wear pads, is vulcanised in an oven at temperatures of typically 150-180° C. to form the rings 12. Thereafter the casing 6 is lowered into the wellbore 1 until the rings 12 are positioned in said portion of the wellbore 1 opposite the earth formation layer 4. The thickness of the rings 12 is selected sufficiently small to allow unhampered lowering of the casing 6.

Upon flow of saline formation water from formation layer 4 into the wellbore 1, the saline formation water thereby comes into contact with the water swelling rings 12. Due to the salt concentration in the salt particles (pure salt) being much higher than the salinity of the formation water itself, permeation of formation water into the rubber matrix material will occur as a result of osmosis, which leads to swelling of the rings 12 whereby the rings 12 become pressed against the wellbore wall and thereby completely seal the annular space 7. In this manner any further migration of formation water through the annular space 7 is prevented.

If required the casing 6 is radially expanded in the wellbore, preferably before swelling of the rings 12 occurs.

All samples referred to in FIGS. 2a, 2b and 3 were immersed in saline aquifer water ("100% Oman aquifer water") including 139 gram/liter NaCl, 41 gram/liter $CaCl_2$, 7.5 gram/liter $MgCl_2$, and having a temperature of 95° C.

Instead of applying the rings (referred to in FIGS. 4 and 5) on a casing, the rings can be applied on one or more sections of blank pipe arranged between sections of sandscreen, for example expandable sandscreen. In this manner it is feasible to create separate sandscreen inflow sections which can be selectively shut-off during the lifetime of the well.

Suitably the casing is an expandable casing which is radially expanded in the wellbore before or after swelling of the rings, preferably before swelling of the rings.

To prevent or reduce leaching of said compound out of the body of swelleable material, it is preferred that said body includes a matrix material substantially impermeable to said compound or to ions formed of said compound.

Preferably the matrix material includes a polymer matrix material, for example a thermoset elastomer matrix material or a thermoplastic elastomer matrix material.

In a preferred embodiment the polymer matrix material is obtained or obtainable by mixing the compound in a mass of polymer material and thereafter vulcanizing the mass of polymer material to form said polymer matrix material. For example, the compound is formed by salt particles, which are mixed into the mass of polymer material prior to cross-linking (vulcanization) thereof, followed by cross-linking of the polymer material to form the elastomer matrix material in which the salt particles are embedded.

Suitable thermoset elastomer materials capable of withstanding the high wellbore temperatures for a prolonged period of time are:

1) rubber materials which, apart from swelling in water, also swell in crude oil present in petroleum wells, such as Ethylene Propylene Rubber (EPM and EPDM), Ethylene-Propylene-diene Terpolymer rubber (EPT), butyl rubber (IIR), brominated butyl rubber (BIIR), chlorinated butyl rubber (CIIR), chlorinated polyethylene (CM/CPE), neoprene rubber (CR), styrene butadiene copolymer rubber (SBR), suiphonated polyethylene (CSM), ethylene acrylate rubber (EAM/AEM), epichlorohydrin ethylene oxide copolymer (CO, ECO), Silicone Rubbers (VMQ) and Fluorsiicone Rubber (FVMQ);

2) rubber materials which do not swell in crude oil, such as Butadiene acrylonitrile copolymer (Nitrile Rubber, NBR), Hydrogenated NBR (HNBR, HNS) such as ZETPOL®, TORNAC®, TERBAN®, NBR with reactive groups (X-NBR), Fluoro Rubbers (FKM), such as VITON®, FLUOREL®, Perfluoro Rubbers (FFKM) such as KALREZ®, CHEMRAZ® and Tetrafluorethylene/propylene (TFE/P), such as AFLAS®, which would not swell when exposed to oil field crudes.

Most of these elastomers can be crosslinked by more than one crosslinking agent (e.g. either "Sulphur cross-linked of Peroxide cross-linked).

Apart from the thermoset (non swelling and oil swelling) elastomer matrix materials quoted above, also blends of elastomers can be applied ('elastomeric alloys'). Although an almost inexhaustible combination of thermoplastic and thermoset elastomers are feasibles, the most preferable are the EPDM/Polypropylene blends such as SARLINK®, Levaflex®, Santoprene®, NBR-Polypropylene blends such as GEOLAST®, NBR/Polyvinylchloride blends and NR/Polypropylene blends. All of these have a tendency to swell in Petroleum crudes, especially at the targeted downhole well temperatures.

Preferably said compound is incorporated in a plurality of particles homogeneously distributed through the matrix material.

Suitable particles are fine particles of salt, preferably dissociating salt, which can be uniformly compounded into the base rubber. For example extremely fine salt particles which are water soluble are applied, the salt being selected from the group of: acetates; $M-(CH_3COO)$, bicarbonates; $M-(HCO_3)$, carbonates; $M-(CO_3)$, formates $M-(HCO2)$, halides; Mx-Hy (H=Cl, Br or I), hydrosulphides; M-(HS), hydroxides; M-(OH), imides; M-(NH), nitrates; M-(NO3), nitrides; M-N, nitrites; $M-(NO_2)$, phosphates; M-(PO4), sulphides; M-S and sulphates; $M-(SO_4)$, where M can be any metal of the periodic table. Other salts are can be applied where the cation is a non-metal like $NH_4Cl$.

However the preferred salts are NaCl and $CaCl_2$.

To limit leaching out of the salt from the elastomer, suitably the swelleable body includes any hydrophilic polymer containing polar groups of either oxygen or nitrogen in the backbone or side groups of the polymer. These side groups can be partially or fully neutralised. Polymers of such type are, for example, hydrophilic polymer types such as alcohols, acrylates, methacrylates, acetates, aldehydes, ketones, sulfonates, anhydrides, maleic anhydrides, nitriles, acrylonitriles, amines, amides, oxides (polyethylene oxide), cellulose types including all derivatives of these types, all copolymers including one of the above all grafted variants.

Suitably a ternary system is applied which includes an elastomer, a polar SAP and a salt, whereby the polar SAP is grafted onto the backbone of the elastomer. Such system has the advantage that the polar SAP particles tend to retain the salt particles in the elastomer matrix thereby reducing leaching of the salt from the elastomer. The polar salt is attracted by electrostatic forces to the polar SAP molecules, which are grafted ('glued') to the backbone of the rubber.

Generally the swelleable body should be capable of swelling in water of salinity as high as 140 g/Sodium Chloride, and containing considerable concentrations of bivalent ions, such as at least 40 g/l Calcium Chloride and 8 g/l Magnesium Chloride, and at temperatures of at least 40°C. but preferably 100-150°C. which is typical for the static bottom hole temperatures of petroleum wells. The transition from non-swollen to fully swollen state preferably takes place within a timeframe of 2-3 weeks, and the swollen state should be maintained for a period of at least one year.

Those of skill in the art will appreciate that many modifications and variations are possible in terms of the disclosed embodiments, configurations, materials, and methods without departing from their spirit and scope. Accordingly, the scope of the claims appended hereafter and their functional equivalents should not be limited by particular embodiments described and illustrated herein, as these are merely exemplary in nature.

We claim:

1. A system for sealing a space in a wellbore formed in an earth formation, comprising a swellable body to be arranged in the wellbore in a manner so as to seal said space upon swelling of the swellable body, the swellable body when arranged in the wellbore being susceptible of being in contact with formation water flowing into the wellbore, the swellable body comprising a polymer matrix material provided with a compound soluble in said formation water, wherein the matrix material substantially restricts migration of the compound out of the swellable body and allows migration of said formation water into the swellable body by osmosis so as to induce swelling of the swellable body upon migration of said formation water into the swellable body, wherein the polymer matrix material comprises a vulcanized mixture of said compound and a mass of polymer material;
    wherein said compound comprises a salt.

2. The system of claim 1, wherein said matrix material is substantially impermeable to said compound.

3. The system of claim 1, wherein the polymer matrix material is an elastomer matrix material.

4. The system of claim 3, wherein the elastomer matrix material comprises a rubber selected from nitrile rubber, hydrogenated nitrile rubber, nitrile rubber with reactive groups, fluoro rubbers, perfluoro rubbers, tetrafluoroethylene/propylene, and ethylene propylene rubber base rubber.

5. The system of claim 1, wherein the compound is present in the matrix material in the form of a plurality of particles dispersed in the matrix material.

6. The system of claim 5, wherein the particles are substantially uniformly dispersed in the matrix material.

7. The system of claim 5, wherein the particles are embedded in the matrix material.

8. The system of claim 1, wherein the salt is selected from the group consisting of salts of: acetates, M—($CH_3COO$); bicarbonates M—($HCO_3$); carbonates, M—($CO_3$); formats, M—($HCO_2$); halides; $M_x$—$H_y$ (H=Cl, Br or I); hydrosulphides, M—(HS); hydroxides, M—(OH); imides, M—(NH); nitrates, M—($NO_3$); nitrides, M—N; nitrites, M—($NO_2$); phosphates, M—($PO_4$); sulphides, M—S; and sulphates, M—($SO_4$); where M is a metal selected from the group of metals of the periodic table.

9. The system of claim 1, wherein the swellable body contains at least 20wt % salt based on the combined weight of the matrix material and the salt.

10. The system of claim 1, wherein said space is an annular space formed between a tubular element extending into the wellbore and a substantially cylindrical wall surrounding the tubular element.

11. The system of claim 10, wherein said tubular element is a wellbore casing or wellbore liner, and said substantially cylindrical wall is the wellbore wall.

12. The system of claim 1, wherein the swellable body is arranged in a portion of the wellbore opposite an earth formation layer containing said formation water.

13. The system of claim 1, wherein the formation water is saline formation water.

14. A system for sealing a space in a wellbore formed in an earth formation, comprising a swellable body to be arranged in the wellbore in a manner so as to seal said space upon swelling of the swellable body, the swellable body when arranged in the wellbore being susceptible of being in contact with formation water flowing into the wellbore, the swellable body comprising a polymer matrix material provided with a compound soluble in said formation water, wherein the matrix material substantially restricts migration of the compound out of the swellable body and allows migration of said formation water into the swellable body by osmosis so as to induce swelling of the swellable body upon migration of said formation water into the swellable body, wherein the polymer matrix material comprises a vulcanized mixture of said compound and a mass of polymer material;
    wherein said space is an annular space formed between a tubular element extending into the wellbore and a substantially cylindrical wall surrounding the tubular element; and
    wherein the swellable body is formed by one or more rings, each ring extending around the tubular element.

15. A method of sealing a space in a wellbore formed in an earth formation, comprising arranging a swellable body in the wellbore in a manner so as to seal said space upon swelling of the swellable body, the swellable body being susceptible to being in contact with formation water flowing into the wellbore, the swellable body comprising a polymer matrix material provided with a compound soluble in said formation water, wherein the matrix material substantially restricts migration of the compound out of the swellable body and allows migration of said formation water into the swellable body by osmosis so as to induce swelling of the swellable body upon migration of said formation water into the swellable body, wherein the polymer matrix material comprises a vulcanized mixture of said compound and a mass of polymer material.

16. The method of claim 15, wherein the compound is mixed in the mass of polymer material in the form of a plurality of particles of the compound.

17. The system of claim 15 wherein said matrix material is substantially impermeable to said compound.

18. The system of claim 15 wherein the formation water is saline formation water.

* * * * *